(12) United States Patent
Everman

(10) Patent No.: US 7,240,580 B2
(45) Date of Patent: Jul. 10, 2007

(54) SINGLE DEGREE OF FREEDOM AXIS POSITIONER

(76) Inventor: Michael R. Everman, 82 Aero Camino, Goleta, CA (US) 93117

( * ) Notice: Subject to any disclaimer, the term of this patent is extended or adjusted under 35 U.S.C. 154(b) by 430 days.

(21) Appl. No.: 10/980,450

(22) Filed: Nov. 2, 2004

(65) Prior Publication Data

US 2006/0091734 A1 May 4, 2006

(51) Int. Cl.
*B66C 1/10* (2006.01)
*F16M 13/00* (2006.01)
*F16H 19/06* (2006.01)

(52) U.S. Cl. .................. 74/490.09; 248/569; 248/570; 414/936

(58) Field of Classification Search ............... 108/57.1, 108/57.12, 57.2, 20, 144.11; 74/16, 490.09; 254/282, 278; 248/568–570, 638–639, 560; 294/67.1, 67.4

See application file for complete search history.

(56) References Cited

U.S. PATENT DOCUMENTS

| | | | | |
|---|---|---|---|---|
| 4,432,689 A | * | 2/1984 | Shell | 414/416.01 |
| 5,031,547 A | * | 7/1991 | Hirose | 108/140 |
| 5,207,115 A | * | 5/1993 | Takei | 74/479.01 |
| 5,413,523 A | * | 5/1995 | Tsai | 451/364 |
| 6,554,560 B2 | * | 4/2003 | Sinha | 414/757 |
| 6,732,609 B2 | * | 5/2004 | Asai et al. | 74/490.04 |
| 6,991,064 B2 | * | 1/2006 | Ehrenleitner | 182/141 |

\* cited by examiner

*Primary Examiner*—Burton Mullins
(74) *Attorney, Agent, or Firm*—Donald D. Mon

(57) ABSTRACT

A single degree of freedom positioner resistant to axial and rotational motion on two axes, and to rotation around a third axis, but permitting axial movement along the third axis. The axes are orthogonally related. The positioner is characterized by support of a stage by a plurality of stiffly flexible end supported shear webs that bend in a rolling motion to enable the said axial motion.

15 Claims, 5 Drawing Sheets

SINGLE DEGREE OF FREEDOM AXIS POSITIONER

FIELD OF THE INVENTION

A positioner which confines the movement of a motion stage to a single degree of freedom, namely linear motion along only one axis.

BACKGROUND OF THE INVENTION

Very accurate positioning of an object such as a workpiece or a tool is a fundamental requirement of all product-shaping and deposition mechanisms. Rather large dimensional tolerances on the order of thousandths of an inch have been tolerable for many years, and for a wide range of products they still are. However, newer products, especially in the microelectronics field require that manipulations be held to much closer tolerances, often in the realm of a few microns.

The problems one faces with these new requirements cannot readily be solved by the older approach of better linear guideways and bearings. These all have their own tolerance problems, which are amplified when many of them are involved in the manufacture of the same product. The result has been production equipment which, while made to the best standards attainable with existing approaches, still limit the quality of product that can be produced by them, and increase the scrap rate of a production run.

A large part of this problem resides in the structural support and physical guides required to move and position the tool or the workpiece. Conventional dovetails, rails and rotary bearings all involve problems such as linear runout and backlash that can result in inaccuracies on all six degrees of freedom.

This invention proposes the use of an entirety different positioner which may be thought of as a "motion stage". It prevents motion on five of the six possible degrees of freedom, and severely restrains movement of the stage to the sixth degree. The six degrees of freedom are defined as axial motion along the X, Y and Z axes, and rotation around each of them. In this invention, the single degree of freedom enjoyed will generally be axial along the Z axis. Then axial movement along the X and Y axes, and rotation around any of the X, Y and Z axes is prevented. The Z axis is commonly regarded as the vertical axis. This terminology is used herein for convenience. However, with this invention the Z axis may be directed in other directions, for example horizontally or at an angle to the vertical.

In contrast to the very costly mechanisms presently available for accurate single axis positioning, it is an object of this invention to use simple rotors and flexures that do not involve sliding motion and which inherently prevent twisting, shear, and lateral movement.

It is another object of this invention to provide the positioner as a passive element which permits accurate movement of the stage only along the allowed axis in response to forces exerted along it.

It is another object of this invention to provide the positioner as a product which employs simple flexures and rotors that can readily be manufactured to produce a surprisingly affordable, accurate and useful product.

It is yet another object of this invention to provide a positioner that can be used in a severe vacuum, there to operate efficiently without shedding of particulates or lubricants that could foul the vacuum environment. It inherently does not require lubrication, for example.

It is still another object of this invention to provide guidance for a system in which relatively crude motion means can be used, still to provide such accuracy. For example, an inflatable bladder can be used.

BRIEF DESCRIPTION OF THE INVENTION

This invention controls the movement of a stage which provides a reliable base for a workpiece or a tool, limiting the movement of itself and of what it supports to a single degree of freedom. It employs the in-plane stiffness of stiffly flexible straps engaged to a rotor and to a reference surface, there being at least three of said rotors arranged in plan view as sides of a polygon, preferably a right quadrilateral. The straps are provided in sets, each set having a pair of said straps. The straps have a substantial dimension of width so as to provide a sufficient area for in-plane stiffness.

In the preferred embodiment of the invention, the rotor is restrained only by the straps, the straps of each set being respectively connected to the stage and to the rotor, and to the base and to the rotor, but without contact of the rotor with other structures.

In a variation of the preferred embodiment, the straps of each set are bent in a U-shape around a cylindrical surface on the rotor such that the two straps form part of a single length.

In an alternate embodiment of the invention, the rotor is mounted by a bearing to the base, and both of the straps are engaged to the rotor and to the stage.

It is a feature of this invention that tilting and lateral relative movement of the base and stage are prevented by the in-plane stiffness of the straps, while permitting free and frictionless relative movement of the base and stage.

The above and other features of this invention will be fully understood from the following detailed description and the accompanying drawings, in which:

DETAILED DESCRIPTION OF THE INVENTION

A positioner 20 according to this invention includes a base 21 and a stage 22. The base is established on structure (not shown) such as on a machine foundation, movable in the X Y plane. The stage is parallel to the base.

Figure 1:
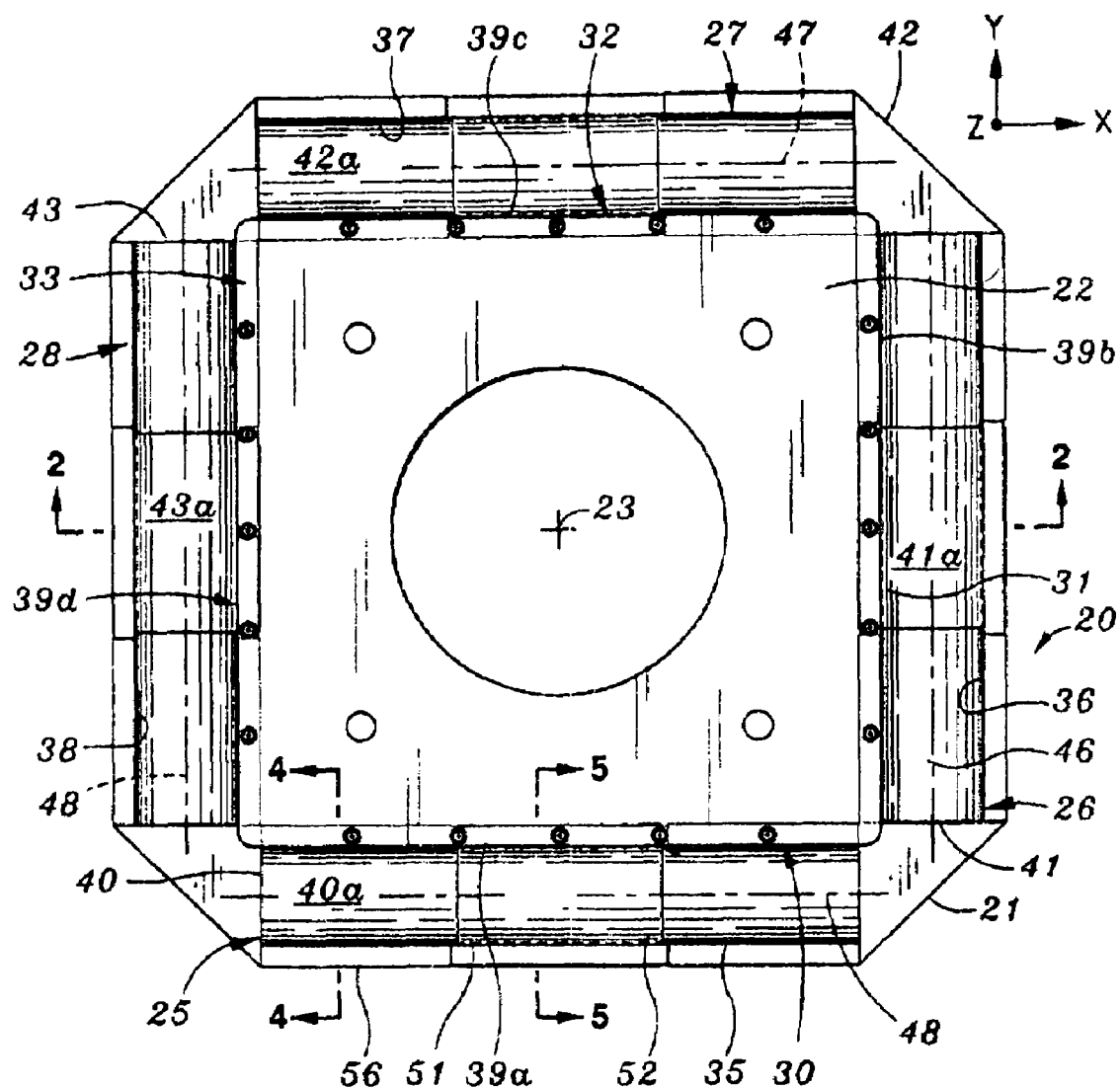
FIG. 1 is a plan view of the presently preferred embodiment of the invention.
Figure 2:
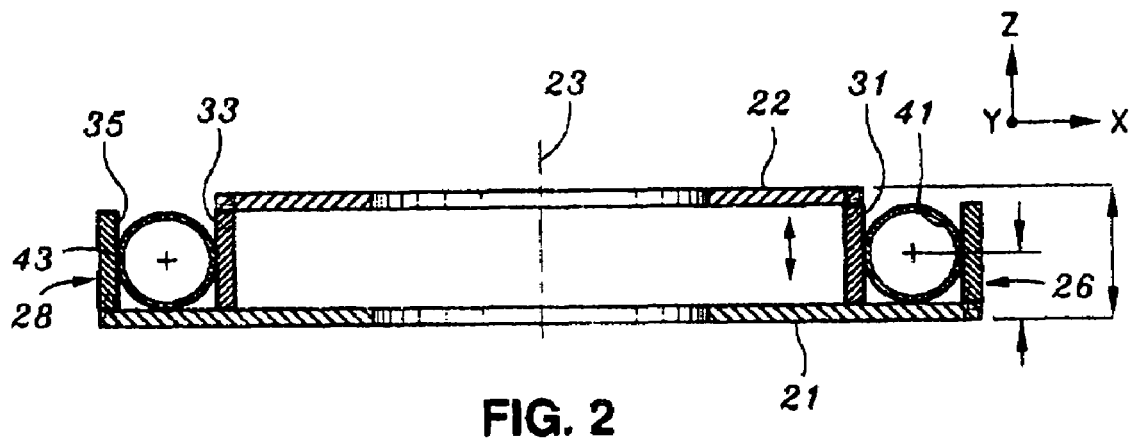
FIG. 2 is a cross-section taken at line 202 in FIG. 1.

The stage is intended to move along Z axis 23 (in the drawings perpendicular to the plane of FIG. 1). Usually the Z axis will be directed vertically, but it is equally possible for it to be other than vertical. For example the XY plane might be tilted relative to the horizontal, or may even be perpendicular to it.

It is the function of this invention to move the stage along the Z axis, without lateral movement in the X Y plane and without rotation around any of the X, Y and Z axes. Accordingly anything mounted to the stage can reliably be moved axially along the Z axis, without twist, tilt or yaw. Surprisingly, utilizing the very simple construction of this invention, the lateral deflection from the Z axis of an object intended to be confined to the Z axis can be held to within 1 micron TIR, and this with coarse motion means driving the stage along the Z axis.

In the preferred embodiment this is accomplished without fixed bearings of any kind. Instead of reliance on fixed bearings or slides for accuracy, this invention utilizes only the in-plane stiffness of edge-supported flexures, as will now be shown. An advantage is that lubrication is not required. There is no sliding motion.

Four base elements 25, 26, 27, 28 are disposed orthogonally around the stage. Because they are all identical, only element 25 will be described in detail. Suffice it to say that base elements 25 and 27 are aligned along the X axis, and base elements 26 and 28 are aligned along the Y axis.

The stage carries four stage elements 30, 31, 32 and 33, respective to base elements 25, 26, 27, 28.

The base carries four base reference surfaces 35, 36,37 and 38, respective to base elements 25, 26, 27, 28. The stage carries four stage reference surfaces 39a, 39b, 39c and 39d, respective to stage elements 30, 31, 32, and 33.

As best shown in FIGS. 2–5, the base reference surfaces are planar. They lie in planes parallel to the central axis. In pairs with opposed stage reference surfaces, they are laterally spaced apart from one another.

Rotors 40, 41, 42 and 43 are placed between opposed reference surfaces. These rotors have external contact segments 40a, 41a, 42a, and 43a which, if not fully cylindrical, are axially extending axial segments of only one cylinder. In fact, because within the range of anticipated usage, rotation of only a few degrees will be usual, only a small cylindrical segment is needed.

Contact segments 40a–43a are centered on respective rotational axes 45, 46, 47 and 48 to form a polygonal array as viewed in plan. These axes are normal to central axis 23 and lie in respective imaginary planes (not shown), that are normal to axis 23. Although it is not necessary, the cylindrical axes will either lie on the same imaginary plane, or in planes quite close to one another.

FIGS. 1–6 illustrate one embodiment of the suspension of the rotors. In this embodiment there will be three sets of straps along each axis so as to provide a better restraint against axial creep of the rotor, which over time can sometimes occur. These are interspaced to provide angular support for the rotor. In other embodiments, only two sets (supports) are needed. It will be observed that the rotor is supported only by the sets of straps. There is no bearing support for the rotor. This is a "free" rotor.

Because the suspensions are all identical, only the assembly at base element 25 will be described in detail. Suspensions 50, 51 and 52 are disposed side-by-side along rotor 40. These suspensions are made of stiffly flexible flat material which is inextensible. Thin sheet foil steel, for example about inch wide and between about 0.005 and 0.020 inches thick is suitable. Because of its stiffness, when a sheet of it is edge restrained, it will resist shear and in-plane distortion.

Each suspension comprises a central bight and a pair of straps (in this embodiment sometimes called a "sling"). For example, suspension 50 (FIG. 4) has a central bight 55 and straps 56, 57. It will be noted that bight 55 is on the under side of the roller. The same arrangement pertains to suspension 52.

Suspension 51 (FIG. 5) is disposed between suspensions 50 and 52. It has a central bight 60 and two straps 61,62. It will be noted that its bight is on the upper side of rotor 40. Rotor 40 is thereby trapped between the two suspensions.

The outer diameter of the rotor (its own contact surface) is equal to the spacing between the reference surfaces, less twice the thickness of the straps. It may be slightly less. In some uses, it may be desirable to fix the straps to the rotor. A local tack weld between the bights and the rotor is sufficient.

Figure 10:
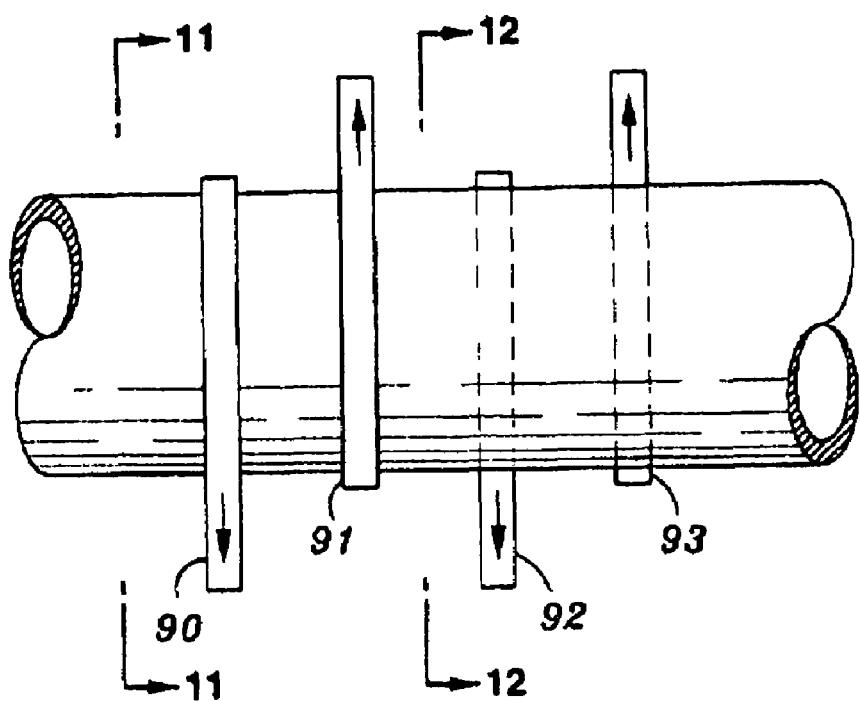
FIG. 10 is a side view of a rotor with different means to mount the rotor.

Often, a direct compression of the rotor will be undesirable. Then, as shown in FIG. 10, the reference surface can be recessed by a slot, and the rotor and that portion of the strap in contact with it will be free from direct contact with the reference surface, while the end portions of the strap do make contact with it.

Figure 3:
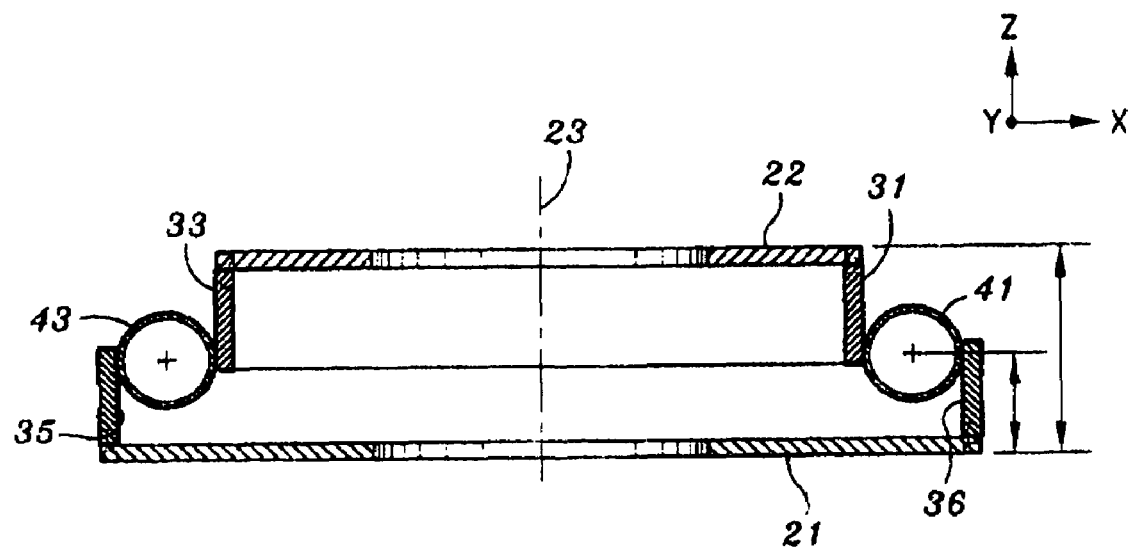
FIG. 3 is a cross-section similar to FIG. 2, showing the device in another adjusted position.
Figure 6:
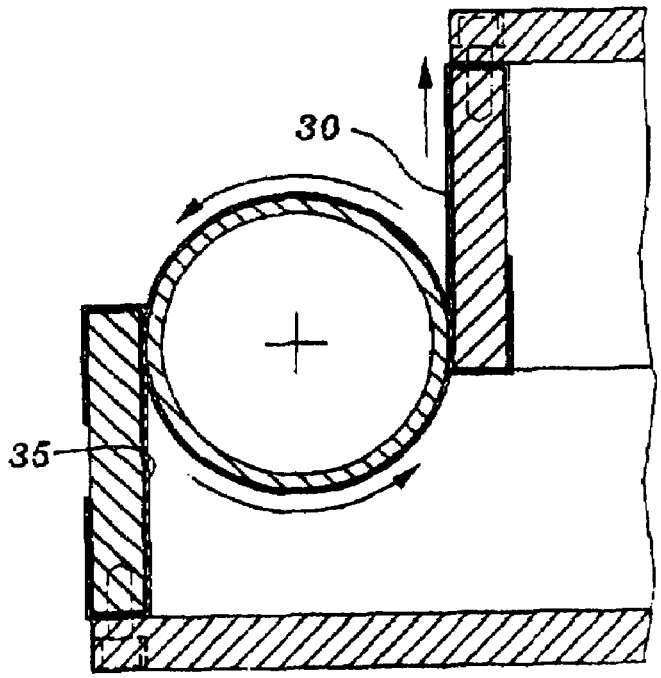
FIG. 6 is a section similar to FIG. 4 showing the movement of the flexures when the stage rises.

As can be seen in FIGS. 3 and 6, raising the stage relative to the base causes one of the straps of each suspension to shorten, and the other to lengthen equally. Lowering the stage causes a reverse exchange of strap length.

Figure 4:
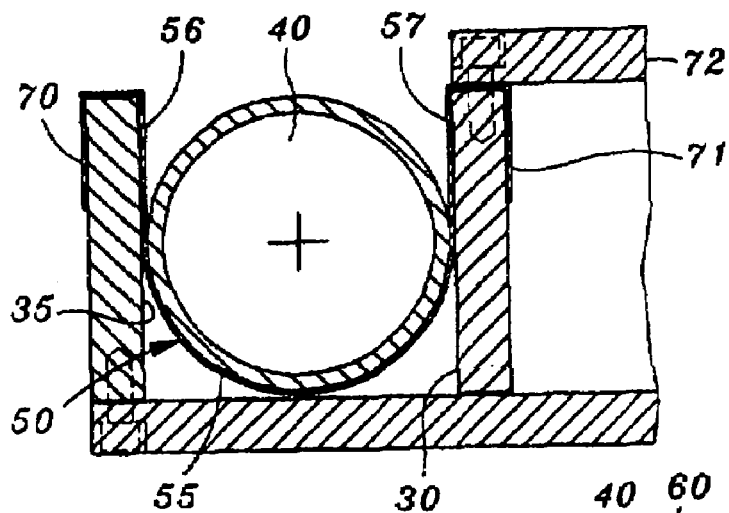
FIGS. 4 and 5 are fragmentary cross-sections showing the rotation arrangement of two of the flexures.
Figure 5:
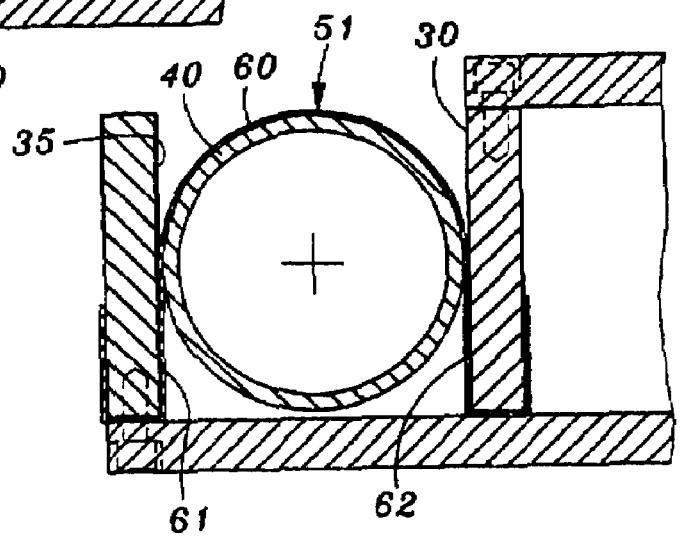

The assembly of rotor and suspension is assembled very precisely, so that the ends of the straps are tightly held to respective reference surfaces. A convenient technique is shown in FIG. 4, where end 70 of a strap is wrapped tightly over a structural edge to hold it in place. It can be clamped, or tack welded or otherwise smoothly held to the structure.

In every embodiment of this invention, the suspension (or its parts) are "mounted" to the rotor. In the embodiment of FIG. 1, it is "mounted" by being wrapped to the rotor. In other arrangements it is attached to the rotor adhesively or by a tack weld for example. The term "mounted" is intended to include "attached", because some portion of the suspension is always held to the rotor so it does not slip with rotation of the rotor—it simply rolls along the rotor.

The end 71 of the other strap is fixed to the stage. It also may be folded over, and held clamped by a surface plate 72. The objective is to hold the suspension material in a smooth tight, edge supported condition, so that the straps from the tangent line with the roller to the attachment point have an evenly tensioned plate-like planar shape.

Both straps, when attached, tightly bear against the rotor. Accordingly, the arms comprise shear-web structures which strongly resist wrinkling and thereby resist shear movement. As can be seen in FIG. 6, when one strap of a suspension shortens, the other lengthens, and the reverse is true of the next adjacent sling. Any effort to tilt or relatively shift the stage on any degree of freedom is thereby made impossible.

Figures 7, 8:
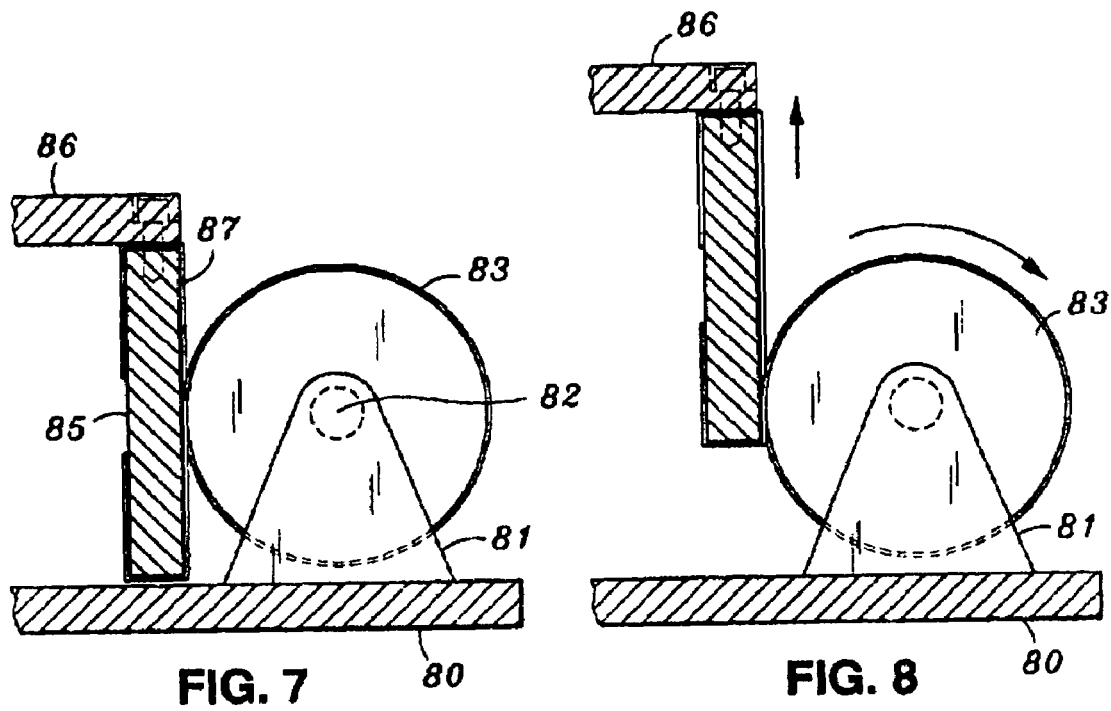
FIGS. 7 and 8 are fragmentary end views, partly in cross-section showing a different mounting for the rotor.
Figure 9:
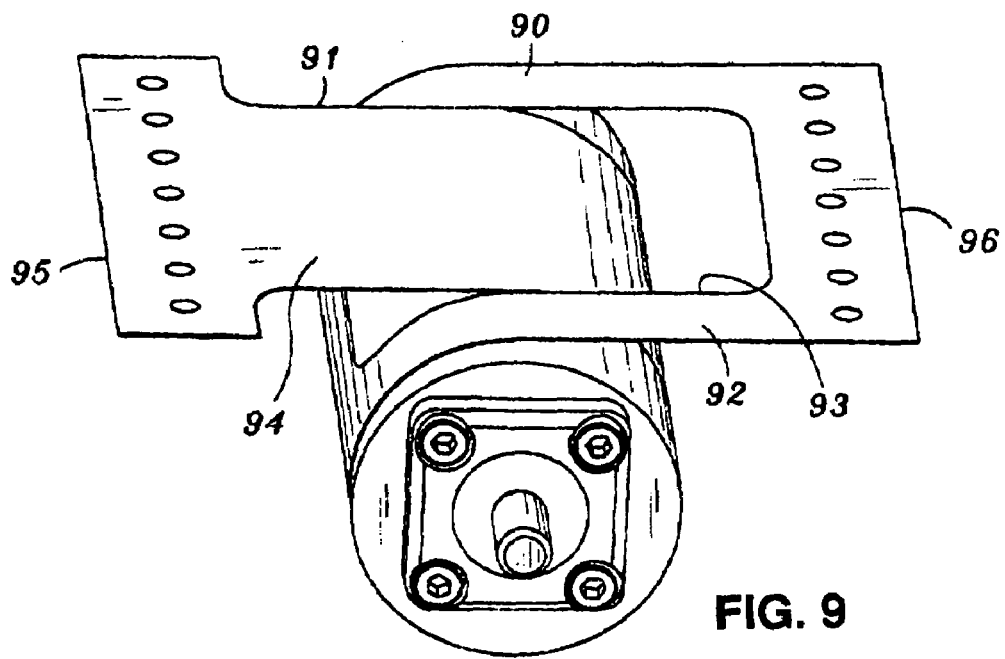
FIG. 9 is a perspective view of a single piece flexure shaped to provide flexures for any embodiment of this invention.

A similar arrangement, but one which requires bearing restraint of the rotor is shown in FIGS. 7–9. In this embodiment, base 80 carries a support 81 (only one of which is shown). In turn the base supports a bearing 82 at both ends of a rotor 83.

In this embodiment, suspensions engage the rotor, but in a different sense. A railing 85 depends from stage 86 with a reference surface 87. The suspensions may conveniently be a single piece with three sectors 90, 91, 92, formed by an aperture 93 and a tongue 94.

As shown in FIG. 9, a strap formed by a tongue 94 is passed through the aperture, and ends 95, 96 are attached to the reference surface. Thus, tongue 94 and ends 95 and 96 comprise straps adherent to the rotor.

Upward or downward movement of the stage relative to the base lengthens and equally shortens the length of the straps of the suspensions. Accordingly, the tightly supported flexible material between the tangent points and the points of attachment forms rigid panels, as in the situation of FIG. 1. Identical assemblies are found at all four sides of the stage.

The embodiment of FIGS. 7–9 is functional for the intended purpose, but inherently relies on the accuracy of its bearings, and involves friction, which the embodiment of FIG. 1 does not. Even so, the rigid suspension caused by the arm panels (straps) provides the same kind of rigidity.

The stage is moved up and down by any desired motive means. Inherently the stage is biased downwardly by its own weight, but its vertical location can readily be learned from any desired metrical system. Relatively crude motive means may be used, such as inflatable bladders which themselves provide no side support. This device does provide it. Alternatively lead screws and the like could be used that press upwardly on the support.

It is not necessary, and in fact generally will not be preferred, for there to be a net fit between the rotor, the straps, and the reference surfaces. This can involve closer tolerances than are ultimately necessary. What is necessary is that each rotor be supported by straps which engage a rotor, one strap or straps extending in one direction and the other strap or straps extending in the other direction. Then when any strap moves relative to the base, one of the other straps of the pair will "unwind" from the rotor, and the other will "wind" onto it, in equal amounts.

When the rotor is supported by a bearing, only one reference plate is needed.

An advantage of providing the straps as part of a single piece is that engagement to the rotor can be provided merely by an embracement. However it is equally possible to attach a strap to the rotor by adhesives, weldments, or fasteners and the suspension does not extend fully around the rotor, but instead may merely be attached to it, with a short free length of straps to bear against the rotor surface to which a portion of the strap is attached to a reference surface. The bight is eliminated.

Figure 11:
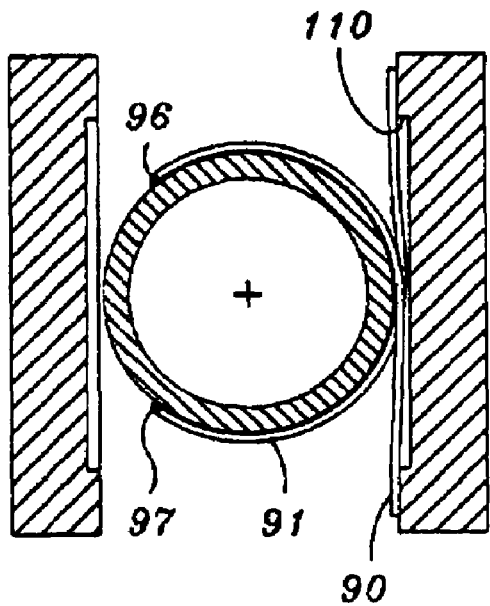
FIG. 11 is a cross-section taken at line 11—11 in FIG. 10.
Figure 12:
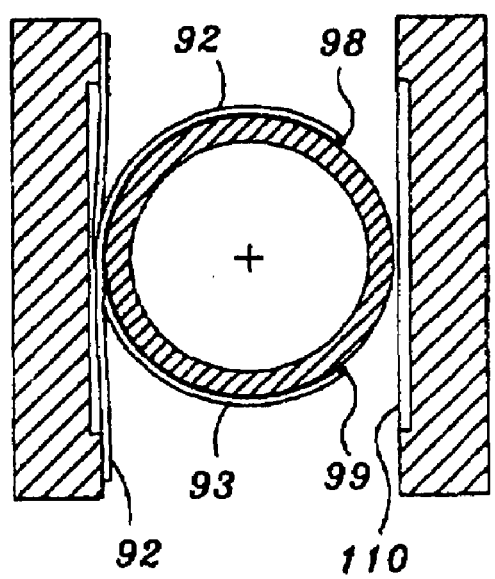
FIG. 12 is a cross-section taken at line 12—12 in FIG. 10.

FIGS. 10,11 and 12 illustrate the use of individual straps, without a bight. For convenience in illustration, four straps 90,91,92 and 93 are shown, attached to rotor 95. These are attached to the rotor by welds 96,97,98 and 99.

Straps 90 and 92 are axially spaced apart from one another, (FIG. 10) but they are directed in the same direction (as in the U straps of FIG. 1). Similarly, straps 91 and 93 are axially spaced apart, and they are directed in the same direction as each other, as in FIG. 1, in the opposite direction from straps 90 and 92.

It will be observed that straps 90 and 92 form a pair, and straps 91 and 93 a second pair. These correspond to the straps of the U shaped structure of FIG. 1, except there is not an integral bight.

In this embodiment, and also in all other embodiments, to free the rotor and straps from compressive, packed contact, a relief 110 can be formed in the reference surfaces. Typically it will be a few thousandths of an inch deep—deep enough to ensure that the rotor will be free from incidental contact with the reference plate at the tangent line.

There results a movement stage, manufactured from affordable material, which provides accuracies as good as or better than, conventional guidway type assemblies.

This invention is not to be limited by the embodiments shown in the drawings and described in the description, which are given by way of example and not of limitation, but only in accordance with the scope of the appended claims.

I claim:

1. A positioner having a central axis, a base and a stage providing for movement of the stage only along said central axis, with only a single degree of freedom, comprising:

reference surfaces on said base and on said stage parallel to and facing each other in pairs, spaced apart laterally from one another;

a rotor having a central axis with a plurality of external circularly cylindrical segments coaxial with one another placed between each said pair of reference surfaces;

a first and a second suspension, each suspension comprised of flexible, substantially non-stretchable sheet material having a dimension of length and of width to form a pair of flat straps, the straps of each suspension being attached to a respective reference surface, with the straps of each pair extending in the same direction from the rotor, but on opposite sides of the rotor, and the straps of each pair directed in the opposite direction from the straps of the other pair, the straps of each pair being joined by a bight which abuts said rotor, as a single suspension, the bights being in abutment with a respective segment, and all of the straps being mounted to the rotor and in contact with a respective segment, whereby the rotor is trapped between the said suspensions, and is freely rotatable when the base and stage move axially relative to one another;

each assembly of said surfaces, rotor and suspensions comprising a set, there being at least three of said sets, with the axes of the cylindrical segments forming a closed polyhedron when viewed in plan along the central axis of the positioner;

said straps resisting, in shear, relative shifting movement of the base and stage in their respective planes, thereby as a group restraining the stage from lateral and rotational movement relative to the base, while permitting axial movement of the stage solely along the said central axis of the positioner.

2. A positioner according to claim 1 in which at least three of said pairs are provided on each set, one of said pairs being abutted on both sides by a pair whose straps extend in the opposite direction.

3. A positioner according to claim 1 in which four of said sets are provided in a quadrilateral array.

4. A positioner according to claim 3 in which at least three of said pairs are provided, with at least one of said pairs of each set being abutted on both sides by a pair whose straps extend in the opposite direction.

5. A positioner according to claim 1 in which the axes of all of said rotors are coplanar, viewed in plan.

6. A positioner according to claim 1 in which said bights are attached to said rotor.

7. A positioner having a first and a second suspension, each suspension comprised of flexible, substantially non-stretchable sheet material having a dimension of length and of width to form a pair of flat straps, the straps of each suspension being attached to a respective reference surface, with the straps of each pair extending in the same direction from the rotor, but on opposite sides of the rotor, and the straps of each pair directed in the opposite direction from the straps of the other pair, and all of the straps being attached to the rotor and in contact with a respective segment whereby the rotor is trapped between the said suspensions, and is freely rotatable when the base and stage move axially relative to one another;

each assembly of said surfaces, rotor and suspensions comprising a set, there being at least three of said sets, with the axes of the cylindrical segments forming a closed polyhedron when viewed in plan along the central axis of the positioner;

said straps resisting, in shear, relative shifting movement of the base and stage in their respective planes, thereby as a group restraining the stage from lateral and rotational movement relative to the base, while permitting axial movement of the stage solely along the said central axis of the positioner.

8. A positioner according to claim 7 in which at least three of said sets are provided in a closed array viewed in plan.

9. A positioner according to claim 8 in which the axes of all of said rotors are coplanar.

10. A positioner according to claim 7 in which each set includes at least three of said pairs, the orientation of one of the pairs being opposite to the orientation of the pair on each side of it.

11. A positioner having a central axis, a base and a stage providing for movement of the stage only along said central axis, and only with a single degree of freedom, comprising:

a reference surface on said stage parallel to said central axis;

a rotor rotatably mounted to said base having a central axis with a plurality of external circularly cylindrical segments coaxial with one another;

a first and a second strap, each strap comprised of flexible, substantially non-stretchable sheet material having a dimension of length and of width, said first and second strap forming a pair, the straps of each pair being attached to a said respective reference surface and to the rotor, each one extending in the opposite direction from the rotor;

a plurality of said rotors and pairs of straps forming a closed polyhedron viewed in plan;

said straps resisting, in shear, relative shifting movement of the base and stage in their respective planes, thereby as a group restraining the stage from lateral and rotational movement relative to the base, while permitting axial movement of the stage only along the said single axis of the positioner.

12. A positioner according to claim 11 in which at least three of said rotors and pairs of straps are provided.

13. A positioner according to claim 11 in which four of said rotors and pairs of straps are provided in a quadrilateral array.

14. A positioner according to claim 11 in which the axes of all of said rotors are coplanar.

15. A positioner according to claim 11 in which each of said pairs is formed of a single sheet of material, a central portion of said sheet being formed as a central tongue to form one strap, and the material on each side extending in the opposite direction to form another strap.

* * * * *